United States Patent [19]
Ueyanagi

[11] Patent Number: 5,608,153
[45] Date of Patent: Mar. 4, 1997

[54] SEMICONDUCTOR ACCELERATION SENSOR AND TESTING METHOD THEREOF

[75] Inventor: Katsumichi Ueyanagi, Kawasaki, Japan

[73] Assignees: Fuji Electric Co., Ltd., Kawasaki; Fujitsu Ten Limited, Kobe, both of Japan

[21] Appl. No.: 456,279

[22] Filed: May 31, 1995

Related U.S. Application Data

[62] Division of Ser. No. 252,557, Jun. 1, 1994, Pat. No. 5,526,687.

[30] Foreign Application Priority Data

Jun. 3, 1993 [JP] Japan ................... 5-133408

[51] Int. Cl.$^6$ .................................................. G01P 21/00
[52] U.S. Cl. ............................................................ 73/1 D
[58] Field of Search ........................... 73/1 D, 1 DV, 73/514.33; 324/109, 158.1; 364/571.01, 566

[56] References Cited

U.S. PATENT DOCUMENTS

| | | | |
|---|---|---|---|
| 4,553,436 | 11/1985 | Hansson | 73/514.33 |
| 5,060,504 | 10/1991 | White et al. | 73/1 D |
| 5,103,667 | 4/1992 | Allen et al. | 73/1 D |
| 5,277,053 | 1/1994 | McLane et al. | 73/1 D |
| 5,295,386 | 3/1994 | Okada | 73/1 D |
| 5,373,722 | 12/1994 | Spies et al. | 73/1 D |

FOREIGN PATENT DOCUMENTS

| | | |
|---|---|---|
| 0368446 | 5/1990 | European Pat. Off. . |
| 0519626 | 12/1992 | European Pat. Off. . |
| 3824695 | 2/1990 | Germany . |
| 4316263 | 11/1993 | Germany . |
| 3146872 | 6/1991 | Japan . |
| 5264576 | 10/1993 | Japan . |

OTHER PUBLICATIONS

"Die Sensoren der 90er Jahre" Lemme Electronik Jul. 1991, pp. 142–150.

*Primary Examiner*—Hezron E. Williams
*Assistant Examiner*—Helen C. Kwok
*Attorney, Agent, or Firm*—Spencer & Frank

[57] ABSTRACT

A semiconductor acceleration sensor includes a silicon detecting member integrally processed from a silicon substrate, having a weight, a supporting portion, and a beam for coupling the weight with the supporting portion, at least one semiconductor strain gauge being formed on an upper surface of the beam; an upper glass provided on an upper portion of the silicon detecting member, and having a concave by which the weight is displaceable; and a lower glass provided on a lower portion of the silicon detecting member, and having a concave by which the weight is displaceable. The supporting portion of the silicon detecting member is electrostatically jointed with the upper glass and the lower glass, respectively; and conductive film is formed on the concave of the lower glass; and an opening portion through which a wiring pattern is externally derived from the conductive film is formed in the lower glass.

9 Claims, 6 Drawing Sheets

SEMICONDUCTOR ACCELERATION SENSOR AND TESTING METHOD THEREOF

This is a Division of application Ser. No. 08/252,557 filed Jun. 1, 1994 U.S. Pat. No. 5,526,687.

BACKGROUND OF THE INVENTION

1. Field of the Invention

The present invention generally relates to acceleration sensors (accelerometer) for sensing acceleration. More specifically, the present invention is directed to a semiconductor acceleration sensor in which an acceleration detecting circuit is arranged by employing a semiconductor strain gauge, and also to a method for testing the acceleration sensor.

2. Description of the Prior Art

A compact semiconductor acceleration sensor arranged by assembling a strain gauge into a semiconductor substrate is known in the field. Normally, testing of semiconductor acceleration sensors is carried out by utilizing a large-scaled mechanical vibration testing machine. To manufacture a semiconductor acceleration sensor having a uniform sensing characteristic, such an adjusting method has been employed to adjust sensor sensitivities obtained by using the vibration test (namely, acceleration test) on a mechanical vibration testing machine with employment of a correction circuit. However, since a plurality of mechanical vibration testing facilities are operated in a parallel mode so as to perform these sensor testing processes in a mass production, lengthy testing time is necessarily required and, furthermore, the manufacturing cost of the semiconductor acceleration sensor is increased.

Figure 1:
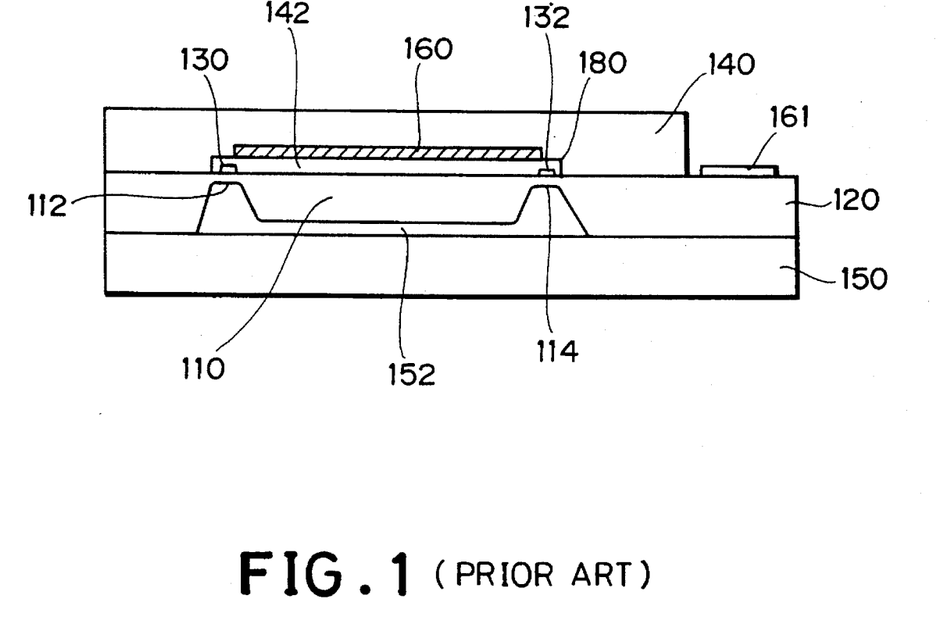
FIG. 1 is a sectional view of one conventional semiconductor acceleration sensor.

To solve the above-explained problems, one conventional testing method has been proposed in U.S. Pat. No. 5,103,667 issued in 1992 to Allen et al. FIG. 1 schematically shows an example of the semiconductor acceleration sensor as disclosed in this U.S. Patent. The acceleration sensor is constructed of silicon mass (weight) 110, a cap 140, and a silicon base 150. The silicon mass 110 is supported via beams (flexible portions) 112 and 114 by a silicon frame 120. Two piezoresistors 130 and 132 are formed on the upper surfaces of the beams 112 and 114. The cap 140 is positioned opposite to the frame 120 in order to define an air gap 142, and a displacement electrode 160 is provided at the inner surface of the cap 140. The mass 110 is located opposite to the silicon base 150 in order to constitute another air gap 152. A pad 161 is provided on the upper surface of the frame 120. This pad 161 is electrically connected to electrode 160 by way of a metal conductor 180 formed on the surface of the cap 140.

The silicon base 150, the silicon frame 120, and the silicon cap 140 are jointed with each other, or adhered to each other. Even if these components are jointed with each other by solder, or adhered to each other by using an adhesive agent, any of these adhesive layers and joint layers would deteriorate, resulting in poor reliability. There is another problem that the thickness of either the joint layer, or the adhesive layer must be controlled.

As the method for jointing the members without any joint (adhesive) agent, the electrostatic joint method (anode joint method) is known in the art. This electrostatic joint method is used to joint silicon with glass in accordance with the following manner. That is, silicon and glass are in close contact with each other. Under heating at temperatures from 300° to 500° C., approximately 500 volts are applied to these silicon and glass connections, so that alkali ions contained in the glass are transferred and a space-charge layer is produced near boundaries between the glass and the silicon. As a result, a large electrostatic force is generated between the surface of the silicon and the glass, whereby chemical bond can occur at the boundaries. It is considered that the chemical bond would be caused by either deformation of the glass by receiving the electrostatic force, or by such a reason that O⁻ (ion) contained in the glass is transferred by receiving the electric field, and then bonded with Si (silicon), whereby $SiO_2$ (silicon oxide) is formed at the boundaries.

In case that the electrostatic joint is employed to joint silicon to silicon as in the above-identified U.S. Patent, an $SiO_2$ film is formed on both surfaces of the silicon to be jointed by way of wet oxidation. At the same time, a large amount of SiOH radical is formed in the $SiO_2$ film. This is because $H^+$ caused by the following reaction formula is used as a carrier:

Since the electrostatic joint of silicon to silicon is carried out at such a high temperature, for example, 900° C., aluminum which is normally employed as a wiring pattern in a semiconductor device could not be used. Furthermore, there is another adverse influence caused by heating such a device in which the circuit has been fabricated under higher temperatures. Practically speaking, it is difficult to apply the above-described electrostatic joint process to the semiconductor acceleration sensor.

Therefore, it is conceivable that glass is used instead of such silicon to form the cap 140 disclosed in the above-explained U.S. Patent, and this glass cap 140 is electrostatically jointed with the silicon frame 120 under low temperatures from 300° C. to 500° C.

Figure 2A:
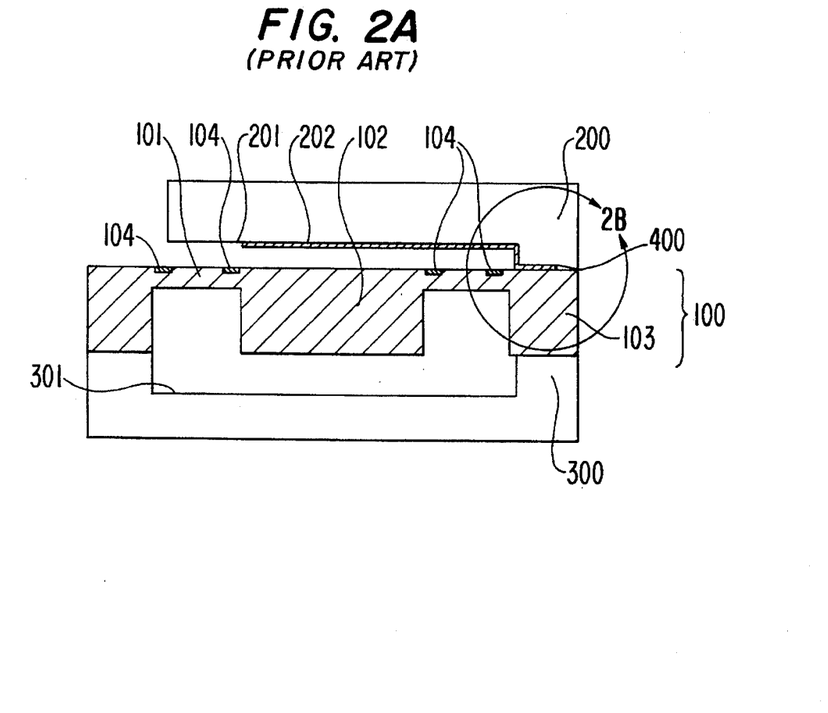
FIG. 2(a) is a sectional view of another conventional semiconductor acceleration sensor.
Figure 2B:
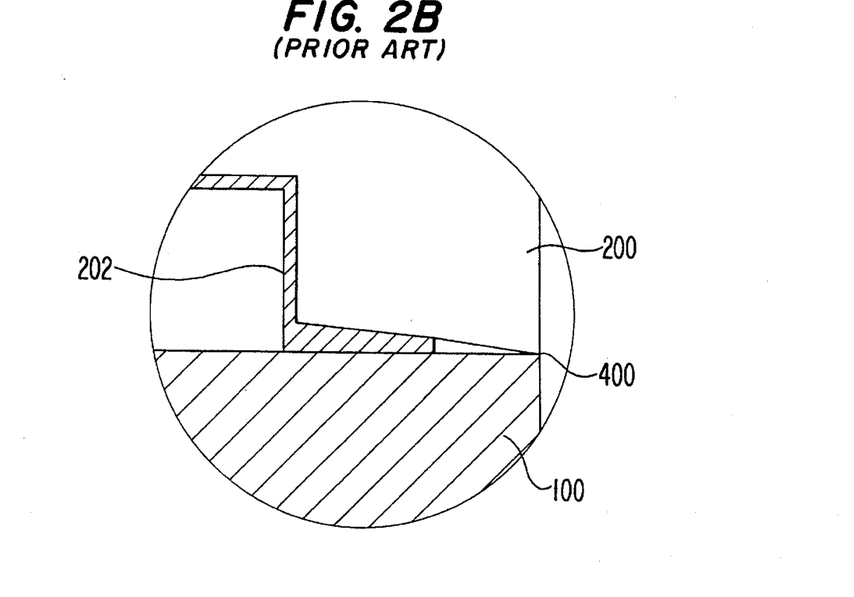
FIG. 2(b) is a partially enlarged view of the semiconductor acceleration sensor shown in FIG. 2(a)

In FIG. 2, there is shown an example where both of a cap 200 and a substrate 300 are made of glass, and such a triple layer structure with a silicon detecting member 100 is electrostatically jointed under a low temperature. FIG. 2 (a) is a sectional view of an overall acceleration sensor, and FIG. 2 (b) is a partially enlarged diagram of this acceleration sensor.

A conductive film 202 is formed in a concave 201 of the cap 200, and a wiring pattern passes from this conductive film 202 via either a joint surface, or an adhesive surface 400 to the silicon detecting member 100 for connection purpose. Here, a Wheatstone bridge is formed on the upper surface of a beam 101 by a semiconductor strain gauge 104, and both the silicon detecting member 100 and the weight 102 are connected to the ground line of this bridge circuit. A supporting member 103 of the silicon detecting member 100 is electrostatically jointed to a substrate 300, thereby forming a concave 301.

To realize such a structure of one conventional semiconductor acceleration sensor, the wiring pattern must be formed from the concave 201 of the cap 200 through either the joint surface, or the adhesive surface 400 to the silicon detecting member 100. As a result, it is technically difficult to maintain flatness of either joint, or the adhesive surface 400, which will deteriorate the reliability of the mechanical strength. In particular, when such an acceleration sensor would be utilized as crash detecting sensors, e.g., automobile air-bag devices, the above-described deteriorated reliability would cause serious sensor problems because the sensor structure would require high reliability. On the other hand, although it may be practically possible to make either the joint area, or the adhesive area larger in order to avoid the above-described problems, there are other different problems that the chip size of the acceleration sensor would become larger, and the manufacturing cost thereof would be increased.

SUMMARY OF THE INVENTION

An object of the present invention is to provide a semiconductor acceleration sensor with high reliability.

Another object of the present invention is to provide such a semiconductor acceleration sensor whose manufacturing cost is low, and which can be easily tested, or calibrated without using large-scaled acceleration testing machines.

A further object of the present invention is to provide a method for testing a characteristic of a semiconductor acceleration sensor without utilizing large-scaled acceleration testing machines.

To achieve the above-described objects, a semiconductor acceleration sensor, according to one aspect of the present invention, is characterized by comprising:

a silicon detecting member integrally processed from a silicon substrate, having a weight, a supporting portion, and a beam for coupling the weight with the supporting portion, at least one semiconductor strain gauge being formed on an upper surface of the beam;

an upper glass provided on an upper portion of the silicon detecting member, and having a concave by which the weight is displaceable; and a lower glass provided on a lower portion of the silicon detecting member, and having a concave by which the weight is displaceable;

wherein the supporting portion of the silicon detecting member is electrostatically jointed with the upper glass and the lower glass, respectively; a conductive film is formed on the concave of the lower glass; and an opening portion through which a wiring pattern is externally derived from the conductive film is formed in the lower glass.

Here, an opening portion for electrically connecting the semiconductor strain gage to an external circuit may be provided between the silicon detecting member and the upper glass.

The beam may be a cantilever.

The beam may be a bridge beam.

The beam may be a two beam bridge structure.

The beam may be a four beam bridge structure.

A dimension of the lower glass may be made larger than that of the silicon detection member.

Also, according to another aspect of the present invention, in a method for testing a semiconductor acceleration sensor comprises: a silicon detecting member integrally processed from a silicon substrate, having a weight, a supporting portion, and a beam for coupling the weight with the supporting portion, at least one semiconductor strain gauge being formed on an upper surface of the beam; an upper glass provided on an upper portion of the silicon detecting member, and having a concave by which the weight is displaceable; and a lower glass provided on a lower portion of the silicon detecting member, and having a concave by which the weight is displaceable; wherein the supporting portion of the silicon detecting member is electrostatically jointed with the upper glass and the lower glass, respectively; a conductive film is formed on the concave of the lower glass; and an opening portion through which a wiring pattern is externally derived from the conductive film is formed in the lower glass, the semiconductor acceleration sensor testing method is characterized in that: a DC (direct current) potential is applied to the conductive film of the lower glass in such a manner that a potential difference is produced between the substrate of the silicon detecting member and the concave of the lower glass; and artificial-acceleration is produced by way of electrostatic force exerted between the lower surface of the weight of the silicon detecting member and the conductive film formed on the concave of the lower glass, thereby performing calibration of the semiconductor acceleration sensor.

The calibration may be carried out in such a manner that a characteristic curve representative of a relationship between the applied DC potential and the artificial-acceleration is utilized as a calibration curve.

Further, according to another aspect of the present invention, in a method for testing a semiconductor acceleration sensor comprises: a silicon detecting member integrally processed from a silicon substrate, having a weight, a supporting portion, and a beam for coupling the weight with the supporting portion, at least one semiconductor strain gauge being formed on an upper surface of the beam; an upper glass provided on an upper portion of the silicon detecting member, and having a concave by which the weight is displaceable; and a lower glass provided on a lower portion of the silicon detecting member, and having a concave by which the weight is displaceable; wherein the supporting portion of the silicon detecting member is electrostatically jointed with the upper glass and the lower glass, respectively; a conductive film is formed on the concave of the lower glass; and an opening portion through which a wiring pattern is externally derived from the conductive film is formed in the lower glass, the semiconductor acceleration sensor testing method is characterized in that: a AC (alternating current) potential is applied to the conductive film of the lower glass in such a manner that a potential difference is produced between the substrate of the silicon detecting member and the concave of the lower glass; and artificial-acceleration is produced by way of electrostatic force exerted between the lower surface of the weight of the silicon detecting member and the conductive film formed on the concave of the lower glass, thereby performing calibration of the semiconductor acceleration sensor.

The calibration may be carried out in such a manner that a characteristic curve representative of a relationship between the applied AC potential and the artificial-acceleration is utilized as a calibration curve.

The above and other objects, effects, features and advantages of the present invention will become more apparent from the following description of embodiments thereof taken in conjunction with the accompanying drawings.

BRIEF DESCRIPTION OF THE DRAWINGS

For a better understanding of the present invention, reference is made of the detailed description to be read in conjunction with the accompanying drawings, in which.

DETAILED DESCRIPTION OF THE PREFERRED EMBODIMENTS

Referring now to the drawings, a semiconductor acceleration sensor according to embodiments of the present invention will be described in detail.

Figure 3:
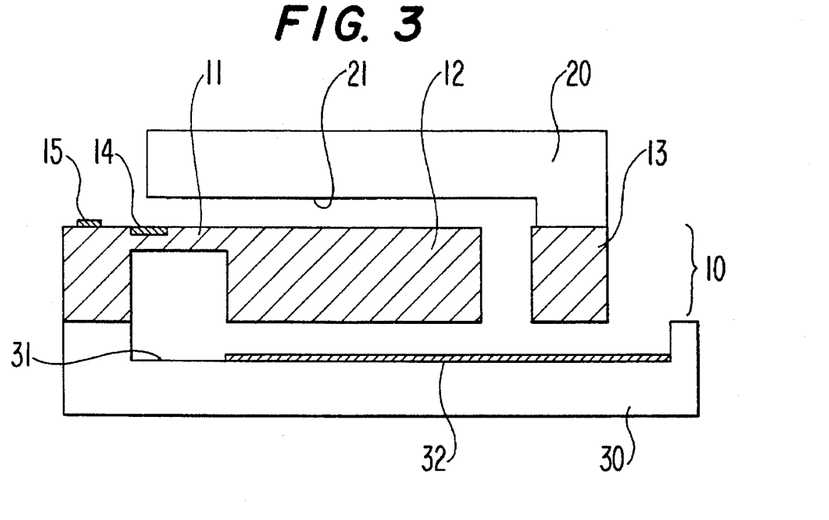
FIG. 3 is a sectional view of a semiconductor acceleration sensor according to a first embodiment of the present invention.
Figure 4A:
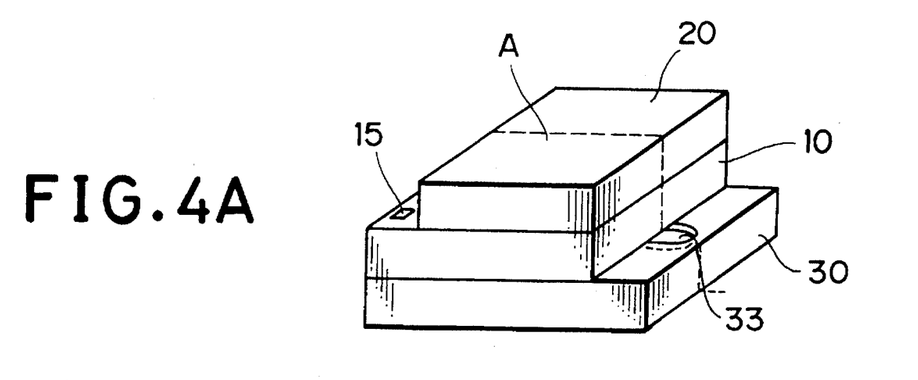
FIGS. 4A to 4D are perspective views showing a structure of the first semiconductor acceleration sensor indicated in FIG. 3, FIG. 4A being a perspective view of an outer appearance of the first semiconductor acceleration sensor, and FIGS. 4B to 4D being exploded perspective views of an upper glass 20, a silicon detecting member 10, and a lower glass 30 of this first embodiment of the semiconductor acceleration sensor, respectively.
Figure 4B:
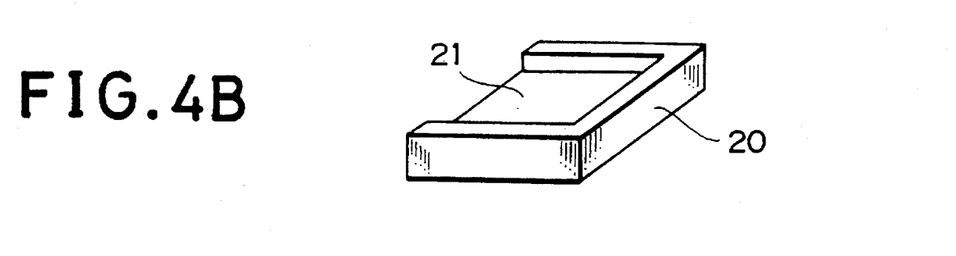
Figure 4C:
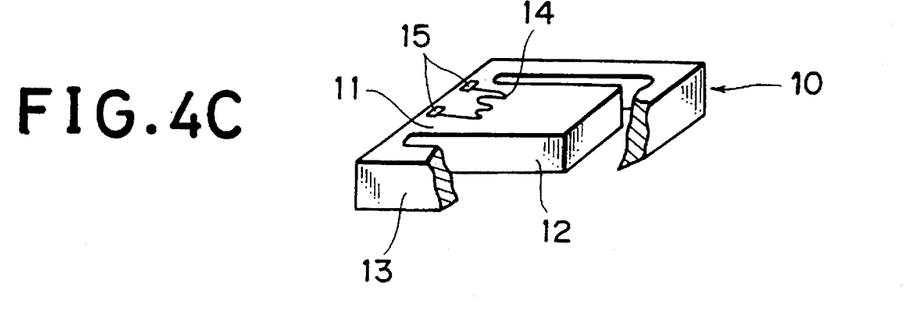
Figure 4D:
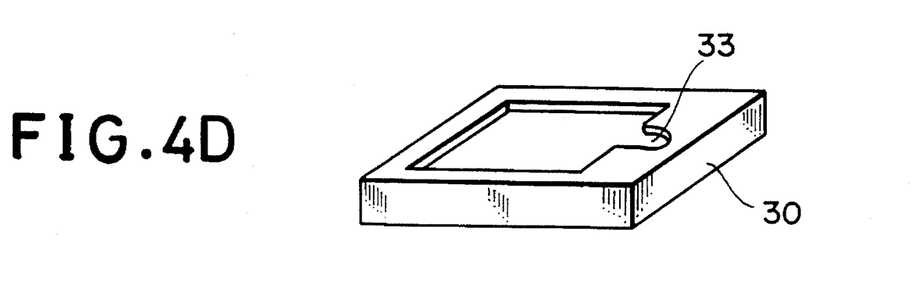

FIG. 3 is a sectional view showing a semiconductor acceleration sensor according to a first embodiment of the present invention. FIGS. 4A to 4D are illustrations for explaining sectional structures of the first semiconductor acceleration sensor. FIG. 4A is a perspective view of an outer appearance of the first semiconductor acceleration sensor, and FIGS. 4B to 4D are exploded perspective views of an upper glass 20, a silicon detecting member 10, and a lower glass 30 thereof, respectively. That is, FIG. 4B schematically show an exploded perspective view of the upper glass 20 whose upper and lower portions are reversed (i.e., the upper glass 20 is shown upside down), and FIG. 4C is a partial fragmentary diagram of the silicon detecting member 10. FIG. 3 is a sectional view of the first acceleration sensor, taken along a broken line A of FIG. 4A.

As illustrated in FIG. 3, the silicon detecting member 10 includes a cantilever (flexible portion) 11, a weight (mass) 12, and a supporting portion 13, which are integrally processed from a silicon substrate. A semiconductor strain gauge 14 is fabricated on the upper surface of the cantilever 11.

An upper glass 20 where a concave 21 is formed on the side located opposite to the weight 12, is electrostatically jointed by way of the above-explained known method to the upper surface of the supporting portion 13 in such a manner that the weight 12 supported by the beam 11 can be displaced by receiving acceleration. Similarly, a lower glass 30 having a concave 31 located opposite to the weight 12 is electrostatically jointed to a lower side of the supporting portion 13 of the silicon detecting member 10 in such a manner that the weight 12 supported by the beam 11 can be displaced by receiving acceleration. A thin conductive film 32 is formed on the surface of the concave 31 of the lower glass 30 by way of the vapor deposition, sputtering and the like. The size of the lower glass 30 is made slightly larger than that of the silicon detecting member 10 in order that a wiring pattern made of, e,g., aluminum may be derived from the thin conductive film 32 by way of a wire bonding and the like.

The Wheatstone bridge circuit is constructed in such a manner that when acceleration is generated, a difference output is produced by the plurality of semiconductor strain gauges 14 fabricated on the upper surface of the beam 11. The silicon substrate of the silicon detecting member 10 is connected to a ground line of a power supply to this Wheatstone bridge circuit. Otherwise, the potential at the substrate is set to the ground potential.

It should be noted that a semiconductor strain gauge per se is known in the art, and therefore the semiconductor strain gauge 14 employed in the first embodiment can be manufactured by employing the known manufacturing method. Strain produced in the beam (flexible portion) 11 is externally derived as a resistance variation by the strain gauge 14 via a pad 15 provided on the surface of the detecting member 10. Also in this semiconductor acceleration sensor, the wiring pattern portion thereof is protected by a passivation film such as either $SiO_2$, or SiN similar to the normal semiconductor device. As a consequence, the electrostatic joint between the silicon detecting member 10 and the upper glass 20 is carried out so as not to contact with either the wiring pattern, or the passivation film, and the left end of the upper surface of the silicon detecting member represented in FIG. 3 is opened. This may ensure the electrostatic joint, and also improve the safety characteristics of the wiring pattern. Similarly, a notch portion 33 is provided on the lower glass 30, so that the connection of the thin conductive film 32 to the external portion can be readily ensured, and also the electrostatic joint between the silicon detecting member 10 and the lower glass 30 can be ensured. It should be noted that the shape of the notch portion 33 used to derive the wiring pattern from the thin conductive film 32 is not limited to the shapes as shown in FIG. 4A and FIG. 4D. The dimension of the lower glass 30 may be made larger than that of the silicon detecting member 10. For instance, a large opening portion approximated to the entire length of the right end of the silicon detecting member 10 of FIG. 4A may be provided.

Figure 5:
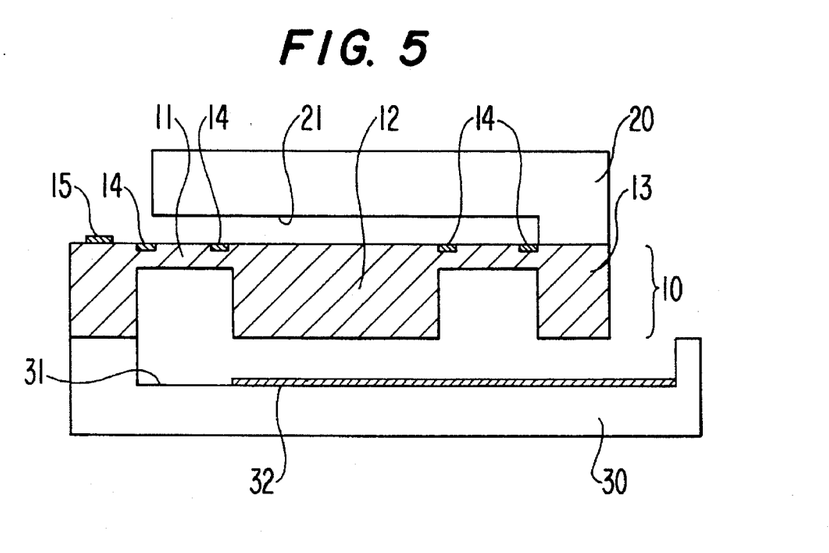
FIG. 5 is a sectional view of a semiconductor acceleration sensor according to a second embodiment of the present invention.
Figure 6:
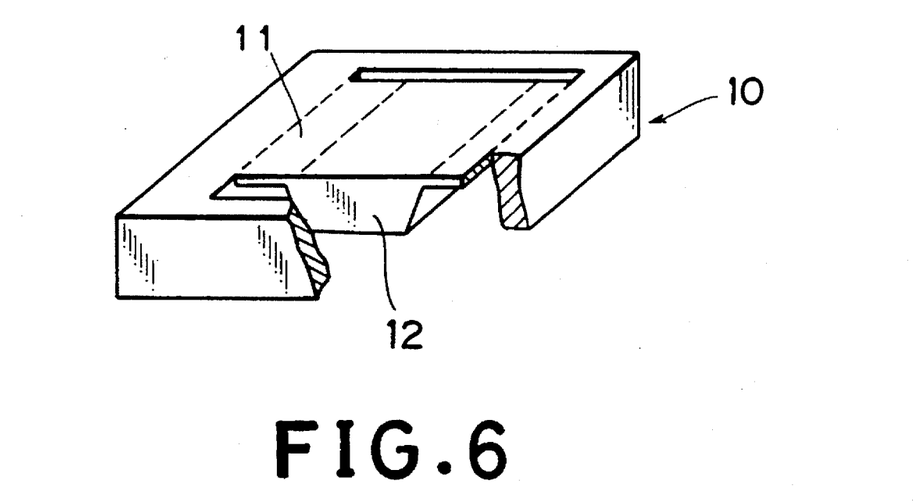
FIG. 6 is a partially fragmentary perspective view of a silicon detecting member having a two-beam bridge structure.
Figure 7:
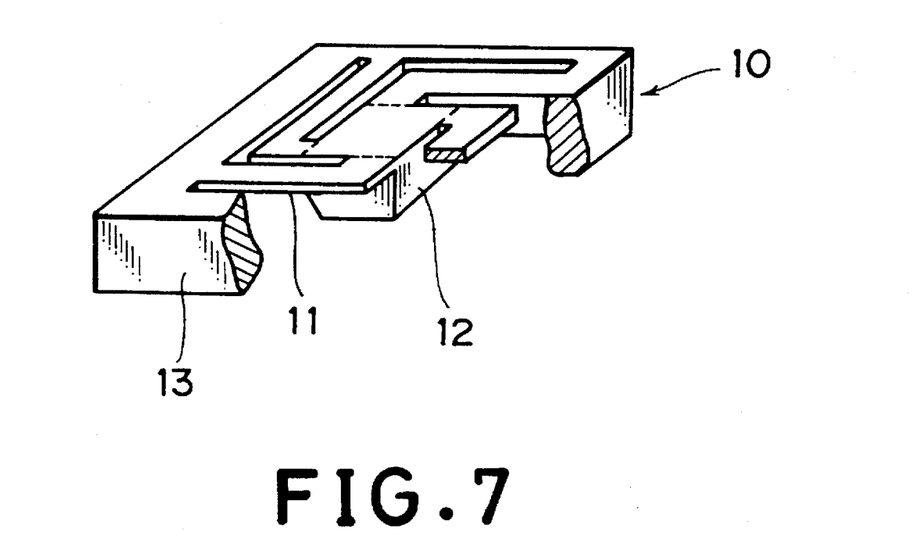
FIG. 7 is a partially fragmentary perspective view of a silicon detecting member having a four-beam bridge structure.

FIG. 5 is a sectional view of a semiconductor acceleration sensor according to a second embodiment of the present invention. Roughly speaking, this second acceleration sensor has a similar structure to that of the first acceleration sensor except that the above-explained cantilever is substituted by a bridge beam. An overall outer appearance of the second semiconductor acceleration sensor is similar to that of FIG. 4A, and FIG. 5 is a sectional view of the second semiconductor acceleration sensor, taken along a broken line A of FIG. 4A. The shapes of the upper glass 20 and the lower glass 30 are similar to those as shown in FIG. 4B and FIG. 4D. FIG. 6 is a partially fragmentary perspective view of a silicon detecting member having a two-beam bridge structure, and FIG. 7 is a partially fragmentary perspective view of another silicon detecting member having a four-beam bridge structure. The silicon detecting member 10, the upper glass 20, and the lower glass 30 are electrostatically jointed to each other in a similar manner to that of the first embodiment.

In such a semiconductor acceleration sensor realized by employing the above-described structures, both the upper glass 20 and the lower glass 30 can forcibly stop displacement of the weight 12 in order that the beam 11 is not destroyed by receiving excessive acceleration. Furthermore, excessive vibrations occurred at a resonance frequency of the structure composed of the beam 11 and the weight 12 can be suppressed by the squeeze film effect exerted in a space between the weight 12 and the upper/lower glasses 20, 30.

A description will now be made of a method for calibrating such semiconductor acceleration sensors.

When a voltage "V" is applied to the thin conductive film 32 formed in the concave 31 of the lower glass 30, electrostatic force "Fv" represented by the below-mentioned formula is exerted between the lower surface of the weight 12 and the thin conductive film 32 of the lower glass 30. The electrostatic force "Fv" will balance with spring force "Fk" produced by the beam 11 at a point where the weight 12 is displaced by "$\Delta x$". This balancing formula is expressed as follows:

$$Fv = Fk$$

where the force Fv and Fk are represented by the below-mentioned formulae:

$$Fv = 0.5 \times \epsilon \times \epsilon_o \times S \times (V/d - \Delta x)^2$$

$$Fk = K x \Delta x$$

where symbol "$\epsilon$" indicates a relative dielectric constant of a medium existing between the weight 12 and the concave 31 of the lower glass 30, symbol "$\epsilon_o$" denotes a dielectric constant (F/m) of vacuum, symbol "S" shows an area (m$^2$) of the lower surface of the weight 12, symbol "d" represents a depth (m) of the concave 31, symbol "$\Delta x$" indicates displacement of the weight 12 caused by electrostatic force, and symbol "K" shows a spring constant of the beam 11.

The displacement "$\Delta x$" under this balancing condition may be replaced by displacement occurred when certain acceleration is produced. The sensitivity correction of the acceleration sensor can be performed under such a condition that electrostatic force is utilized as artificial-acceleration, namely the calibration may be carried out.

Figure 8:
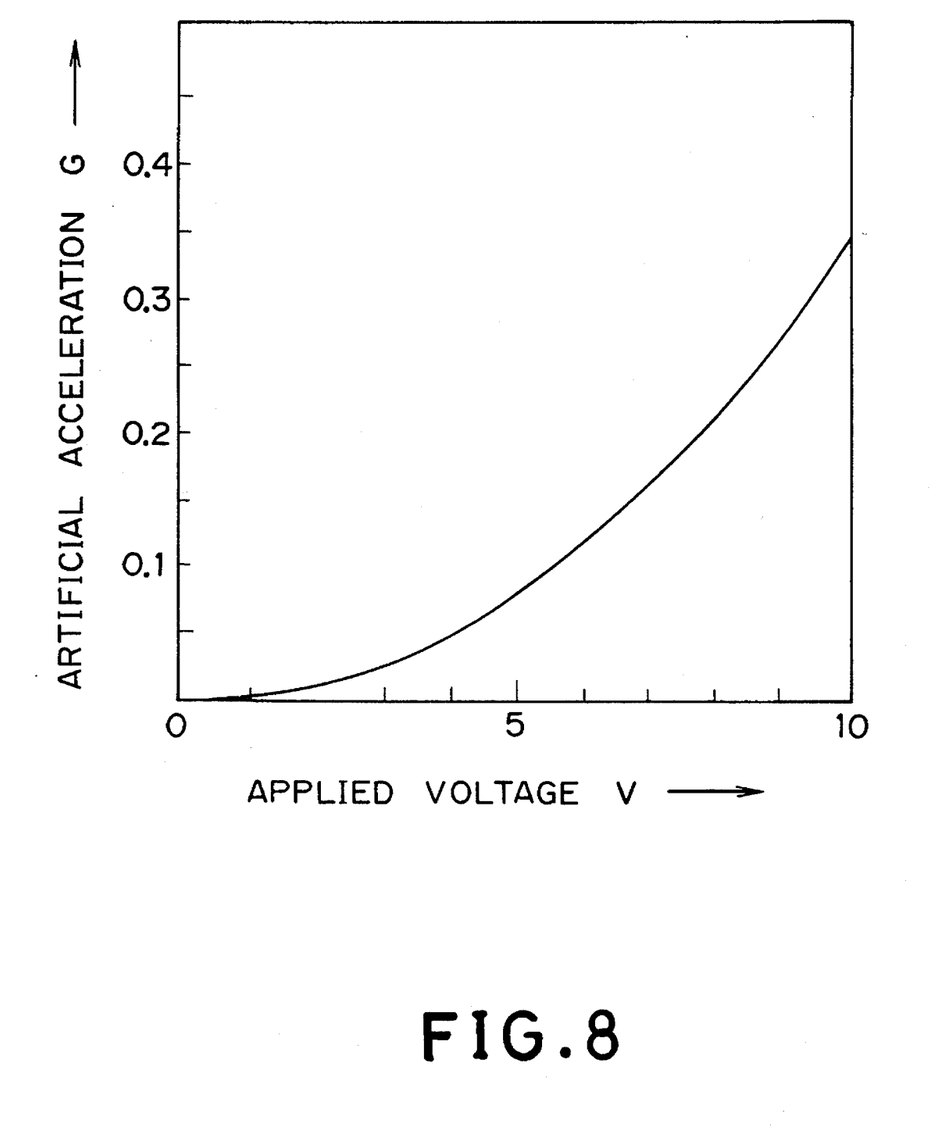
FIG. 8 represents a characteristic curve of a relationship between an applied voltage and artificial-acceleration.

FIG. 8 represents a relationship between the artificial-acceleration "G" and the applied voltage V for producing an electrostatic force under conditions that the above-explained medium is air; the dimensions of the beam 11 are 1.9 mm in length, and 0.03 mm in thickness; the area of the lower surface of the weight 12 is selected to be 2.25 mm$^2$; and the depth of the concave 31 is selected to be 0.012 mm. The curve shown in FIG. 8 is used as the calibration curve so as to perform the sensitivity correction of the acceleration sensor.

It should also be noted that although FIG. 8 indicates such a case when the DC voltage is applied, an AC voltage may alternatively be applied. In this alternative case, a higher artificial-acceleration may be achieved with a lower voltage application by applying such an AC voltage having a frequency close to the natural frequency determined by mass of the weight 12 and the spring constant of the beam 11.

As previously described, according to the present invention, the following various advantages can be achieved.

(1) The sensitivity calibration of the acceleration sensor can be simply carried without using the mechanical vibration test and the mechanical vibration testing machine, so that the manufacturing cost of this acceleration sensor can be lowered.

(2) Since the joint portion among the upper glass, the lower glass, and the silicon detecting member, which may prevent excessive displacement of the weight, can be maintained under flat conditions, reliability about the mechanical strength can be improved.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. A method for testing a semiconductor acceleration sensor, comprising the steps of:

providing a semiconductor acceleration sensor having:
      a silicon detecting member integrally processed from a silicon substrate, having:
         a weight element;
         a supporting portion; and
         a beam coupling said weight element with said supporting portion;
      at least one semiconductor strain gauge formed on an upper surface of said beam;
      an upper glass member provided on an upper portion of said silicon detecting member, and having a concave region located above said weight element in which said weight element is displaceable;
   a lower glass member provided on a lower portion of said silicon detecting member, having a concave region located below said weight element in which said weight element is displaceable, and having an opening formed therein; and
   a conductive film formed in the concave region of said lower glass member;
   wherein said supporting portion of said silicon detecting member is electrostatically joined with said upper glass member and said lower glass member, respectively; and wherein a wiring pattern which is formed on said conductive film passes through the opening of said lower glass member for connection at an external position;
   applying a direct current potential to the conductive film of said lower glass member to produce a potential difference between the substrate of said silicon detecting member and the concave region of said lower glass member;
   exerting an electrostatic force between a lower surface of the weight element of said silicon detecting member and the conductive film formed on the concave region of said lower glass member to produce an artificial acceleration effect; and
   calibrating the semiconductor acceleration sensor by utilizing the artificial acceleration effect.

2. A semiconductor acceleration sensor testing method as claimed in claim 1, wherein said calibrating step includes forming a characteristic curve representative of a relationship between the applied direct current potential and the artificial acceleration effect, and using the characteristic curve as a calibration curve.

3. A semiconductor acceleration sensor testing method as claimed in claim 1, wherein said calibrating step includes calibrating the semiconductor acceleration sensor according to the following formula:

$$Fv = Fk$$

wherein Fv is the electrostatic force exerted by applying the direct current potential V to produce the artificial acceleration effect, and Fk is a spring force of the beam at a point where the weight element is displaced by $\Delta x$, and $$Fv = (0.5) \times (\epsilon) \times (\epsilon_o) \times (S) \times (v/d - \Delta x)^2$$

$$Fk = (K) \times (\Delta x)$$

wherein symbol "$\epsilon$" is a relative dielectric constant of a medium existing between the weight element and the concave region of the lower glass member, symbol "$\epsilon_o$" is a dielectric constant (F/m) of vacuum, symbol "S" is an area (m²) of the lower surface of the weight element, symbol "d" is a depth (m) of the concave region of the lower glass member, and symbol "K" is a spring constant of the beam.

4. The method defined in claim 1, wherein said providing step includes forming the lower glass member to be larger than the silicon detecting member, and communicating the concave region of the lower glass member with ambient air through the opening.

5. A method for testing a semiconductor acceleration sensor, comprising the steps of:

providing a semiconductor acceleration sensor having:
      a silicon detecting member integrally processed from a silicon substrate, having:
         a weight element;
         a supporting portion; and
         a beam coupling said weight element with said supporting portion;
      at least one semiconductor strain gauge formed on an upper surface of said beam;
      an upper glass member provided on an upper portion of said silicon detecting member, and having a concave region located above said weight element in which said weight element is displaceable;
      a lower glass member provided on a lower portion of said silicon detecting member, having a concave region located below said weight element in which said weight element is displaceable, and having an opening formed therein; and
      a conductive film formed in the concave region of said lower glass member;
      wherein said supporting portion of said silicon detecting member is electrostatically joined with said upper glass member and said lower glass member, respectively; and wherein a wiring pattern which is formed on said conductive film passes through the opening of said lower glass member for connection at an external position;
   applying an alternating current potential to the conductive film of said lower glass member to produce a potential difference between the substrate of said silicon detecting member and the concave region of said lower glass member;
   exerting an electrostatic force between a lower surface of the weight element of said silicon detecting member and the conductive film formed on the concave region of said lower glass member to produce an artificial acceleration effect; and
   calibrating the semiconductor acceleration sensor by utilizing the artificial acceleration effect.

6. A semiconductor acceleration sensor testing method as claimed in claim 5, wherein said calibrating step includes forming a characteristic curve representative of a relationship between the applied alternating current potential and the artificial acceleration effect, and using the characteristic curve as a calibration curve.

7. A semiconductor acceleration sensor testing method as claimed in claim 10, wherein said calibrating step includes calibrating the semiconductor acceleration sensor according to the following formula:

$$Fv=Fk$$

wherein Fv is the electrostatic force exerted by applying the alternating current potential V to produce the artificial acceleration effect, and Fk is a spring force of the beam at a point where the weight element is displaced by $\Delta x$, and $$Fv=(0.5)\times(\epsilon)\times(\epsilon_o)\times(S)\times(V/d-\Delta x)^2$$

$$Fk=(K)\times(\Delta x)$$

wherein symbol "$\epsilon$" is a relative dielectric constant of a medium existing between the weight element and the concave region of the lower glass member, symbol "$\epsilon_o$" is a dielectric constant (F/m) of vacuum, symbol "S" is an area (m₂) of the lower surface of the weight element, symbol "d" is a depth (m) of the concave region of the lower glass member, and symbol "K" is a spring constant of the beam.

8. The method defined in claim 5, wherein said providing step includes forming the lower glass member to be larger than the silicon detecting member, and communicating the concave region of the lower glass member with ambient air through the opening.

9. A method for testing a semiconductor acceleration sensor, comprising the steps of:

providing a semiconductor acceleration sensor having:
      a silicon detecting member having:
         a weight element;
         a supporting portion; and
         a beam coupling said weight element with said supporting portion;
      at least one semiconductor strain gauge formed on an upper surface of said beam;
      an upper member provided on an upper portion of said silicon detecting member, and having a concave region located above said weight element in which said weight element is displaceable;
      a lower member provided on a lower portion of said silicon detecting member, and having a concave region located below said weight element in which said weight element is displaceable; and
      a conductive film formed in the concave region of said lower member;
   applying a current potential to the conductive film to produce a potential difference between the silicon detecting member and the concave region of said lower member;
   using the potential difference to exert an electrostatic force between a lower surface of the weight element and the conductive film to produce an artificial acceleration effect; and
   calibrating the semiconductor acceleration sensor by utilizing the artificial acceleration effect, and based on the following formula:

$$Fv=Fk$$

wherein Fv is the electrostatic force exerted by applying the current potential V to produce the artificial acceleration effect, and Fk is a spring force of the beam at a point where the weight element is displaced by $\Delta x$, and $$Fv=(0.5)\times(\epsilon)\times(\epsilon_o)\times(S)\times(v/d-\Delta x)^2$$

$$Fk=(K)\times(\Delta x)$$

wherein symbol "$\epsilon$" is a relative dielectric constant of a medium existing between the weight element and the concave region of the lower member, symbol "$\epsilon_o$" is a dielectric constant (F/m) of vacuum, symbol "S" is an area (m²) of the lower surface of the weight element, symbol "d" is a depth (m) of the concave region of the lower member, and symbol "K" is a spring constant of the beam.

* * * * *